United States Patent

Kagami et al.

[11] Patent Number: 6,081,639
[45] Date of Patent: Jun. 27, 2000

[54] OPTICAL BRANCHING DEVICES

[75] Inventors: Manabu Kagami, Nagoya; Kazuo Hasegawa, Nisshin; Hiroshi Ito, Kasugai, all of Japan

[73] Assignee: Kabushiki Kaisha Toyota Chuo Kenkyusho, Aichi-ken, Japan

[21] Appl. No.: 08/907,618

[22] Filed: Aug. 8, 1997

[30] Foreign Application Priority Data

Aug. 9, 1996 [JP] Japan ................................. 8-227484

[51] Int. Cl.[7] .................................................. G02B 6/26
[52] U.S. Cl. ............................. 385/32; 385/43; 385/48; 385/50
[58] Field of Search ................................ 385/32, 42, 43, 385/45, 48, 50, 14

[56] References Cited

FOREIGN PATENT DOCUMENTS

| 0 477 459 | 4/1992 | European Pat. Off. . | |
| 3904662 | 8/1990 | Germany | 385/32 |
| 52-20043 | 2/1977 | Japan | 385/43 |
| 54-66157 | 5/1979 | Japan | 385/32 |
| 56-167105 | 12/1981 | Japan | 385/43 |
| 62-291604 | 12/1987 | Japan . | |
| 63-89810 | 4/1988 | Japan | 385/32 |
| 63-149610 | 6/1988 | Japan | 385/32 |

Primary Examiner—Hung N. Ngo
Attorney, Agent, or Firm—Oblon, Spivak, McClelland, Maier & Neustadt, P.C.

[57] ABSTRACT

An optical branching device includes a main waveguide and a branching waveguide. A portion of the main waveguide is bent and the branching waveguide is placed close to the bent part of the main waveguide. The branching waveguide has a taper structure such that a width of the branching waveguide is gradually decreased in a propagation direction of light. A central axis of the branching waveguide is tilted from a line extended from a straight part of the main waveguide toward the direction X, or the bending direction of the main waveguide. An input end of the branching waveguide has a normal vector tilted from the central axis of the branching waveguide toward the direction Y, an opposite direction of the bending direction of the main waveguide. With above-mentioned structures, light radiated from the bent part of the main waveguide can be launched into the input end of the branching waveguide and transmitted through the branching waveguide efficiently.

5 Claims, 9 Drawing Sheets

OPTICAL BRANCHING DEVICES

BACKGROUND OF THE INVENTION

1. Field of the Invention

The present invention relates to an optical branching device, and more particularly, to an optical branching device for branching light in multimode transmitted in a planar waveguide.

2. Description of the Related Art

A Y-shaped branching waveguide, in which a waveguide is branched into two, has been known as a branching system of a planar multimode optical waveguide. A mode division system has been also known for coupling the light radiated from a bending portion of an optical fiber with an input end of another optical fiber as a branching system of a multi-mode optical fiber.

Figure 10:
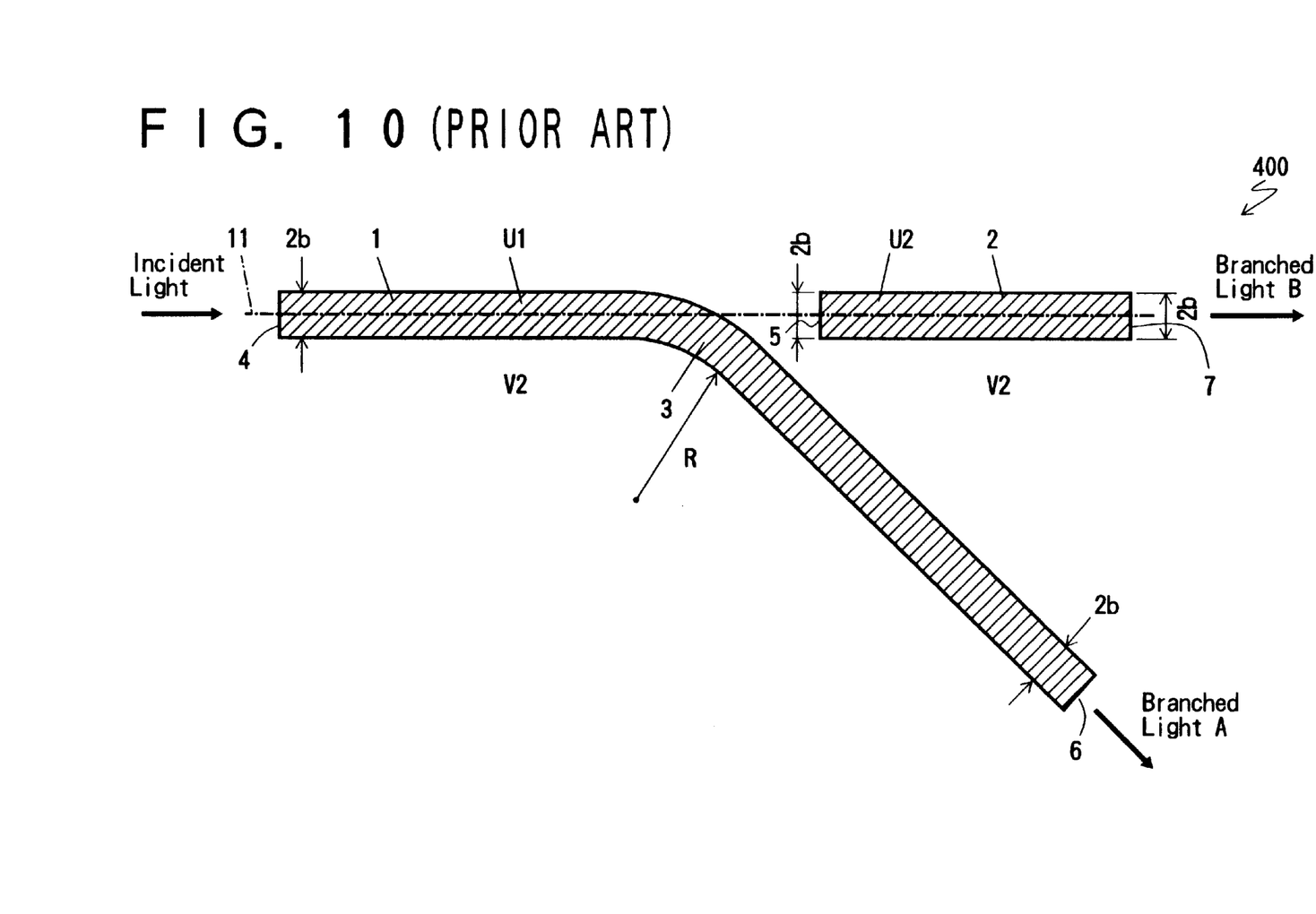
FIG. 10 is a top view of a conventional optical branching device using mode division system.

Further as shown in FIG. 10, the mode division system has been applied to the planar multimode optical waveguide. In an optical branching device as shown in FIG. 10, light is radiated from a core U1 to a cladding V2 by bending a portion of a main waveguide 1 and is coupled with a branching waveguide 2.

However, the conventional optical branching devices described above have several problems.

The Y-shaped branching waveguide has problems in transmission efficiency, because the light is easily lost during its transmission. That is, when a branching angle of the waveguide is large, an incident angle of the light becomes smaller than a critical angle of the waveguide at a branching point and radiation loss emerges. When the branching angle is small, scattering loss emerges due to dull branch shape and transmission loss also emerges, because each of the branching waveguides is elongated in order to be separated enough from each other. As a result, transmission efficiency of the Y-shaped branching waveguide needs to be improved.

The optical branching waveguide 400 as shown in FIG. 10 applying the mode division system to the planar multimode optical waveguide compensates for some of the shortcomings of the Y-shaped branching device. The optical waveguide 400 can branch light with a little loss, because it is designed to use radiated light which is originally to be lost in other devices. Further, the main waveguide 1 of the optical waveguide 400 can obtain a large branching angle and shorten the length of the waveguide 400, because the main waveguide 1 can be bent sharply. However, such structure incurs other problems. The light radiated from the main waveguide 1 becomes scattered and expands to the cladding V2 due to the rugged surface unintentionally formed on the sides of the core U1. As a result, a little light radiated from the main waveguide 1 is caught by an input end 5 of the branching waveguide 2 and thus transmission loss becomes large.

SUMMARY OF THE INVENTION

It is therefore an object of the present invention to transmit light effectively.

Figure 2:
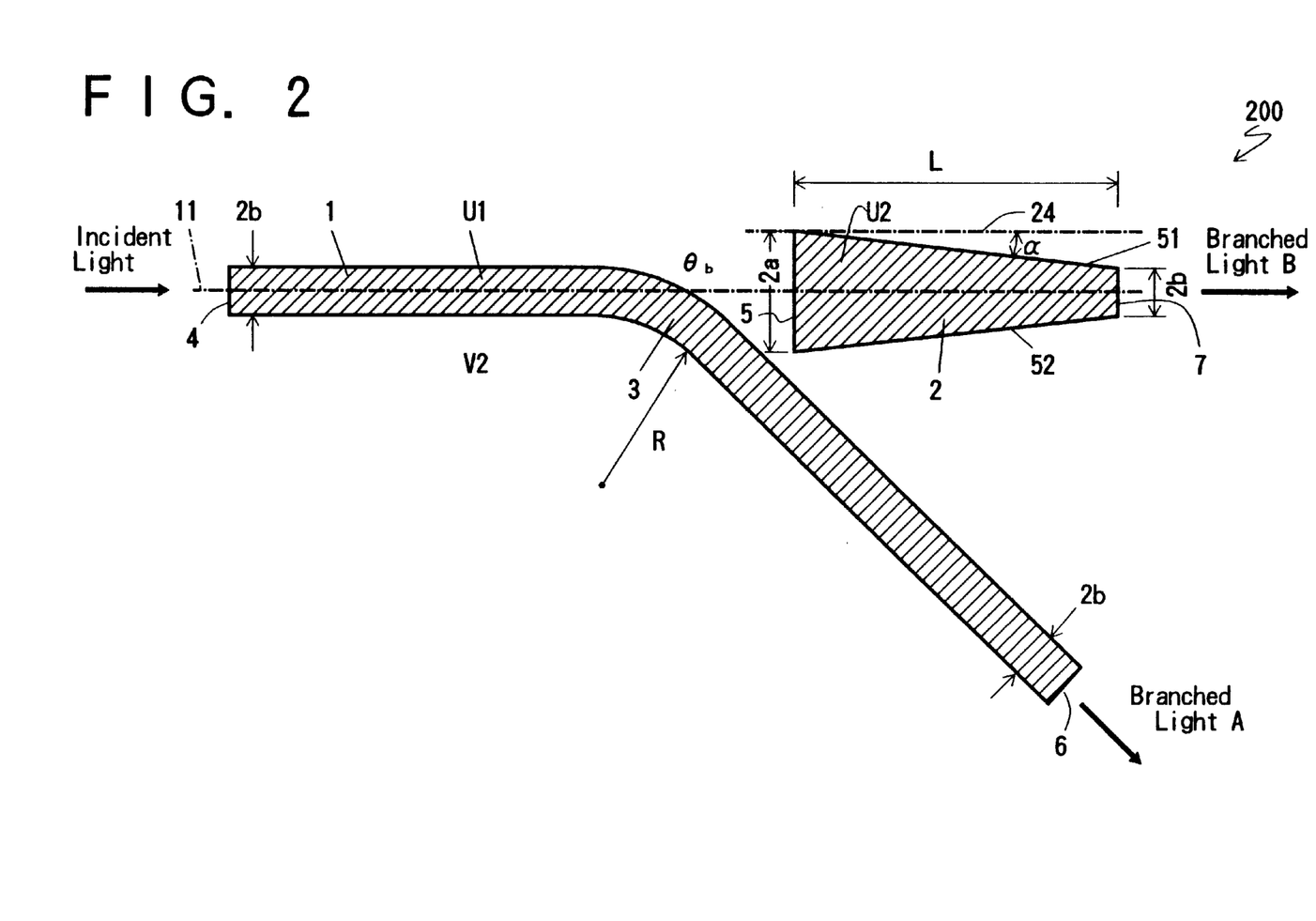
FIG. 2 is a top view of an optical branching device of the first aspect of the present invention.

The first aspect of the present invention resides in an optical branching device as shown in FIG. 2 constituted by a main waveguide 1 having a straight part and a bent part 3, a branching waveguide 2 formed close to the bent part 3 for receiving radiated light from the bent part 3 wherein the branching waveguide 2 has a taper structure such that a width of the branching waveguide is gradually decreased in a propagation direction of light.

Figure 3:
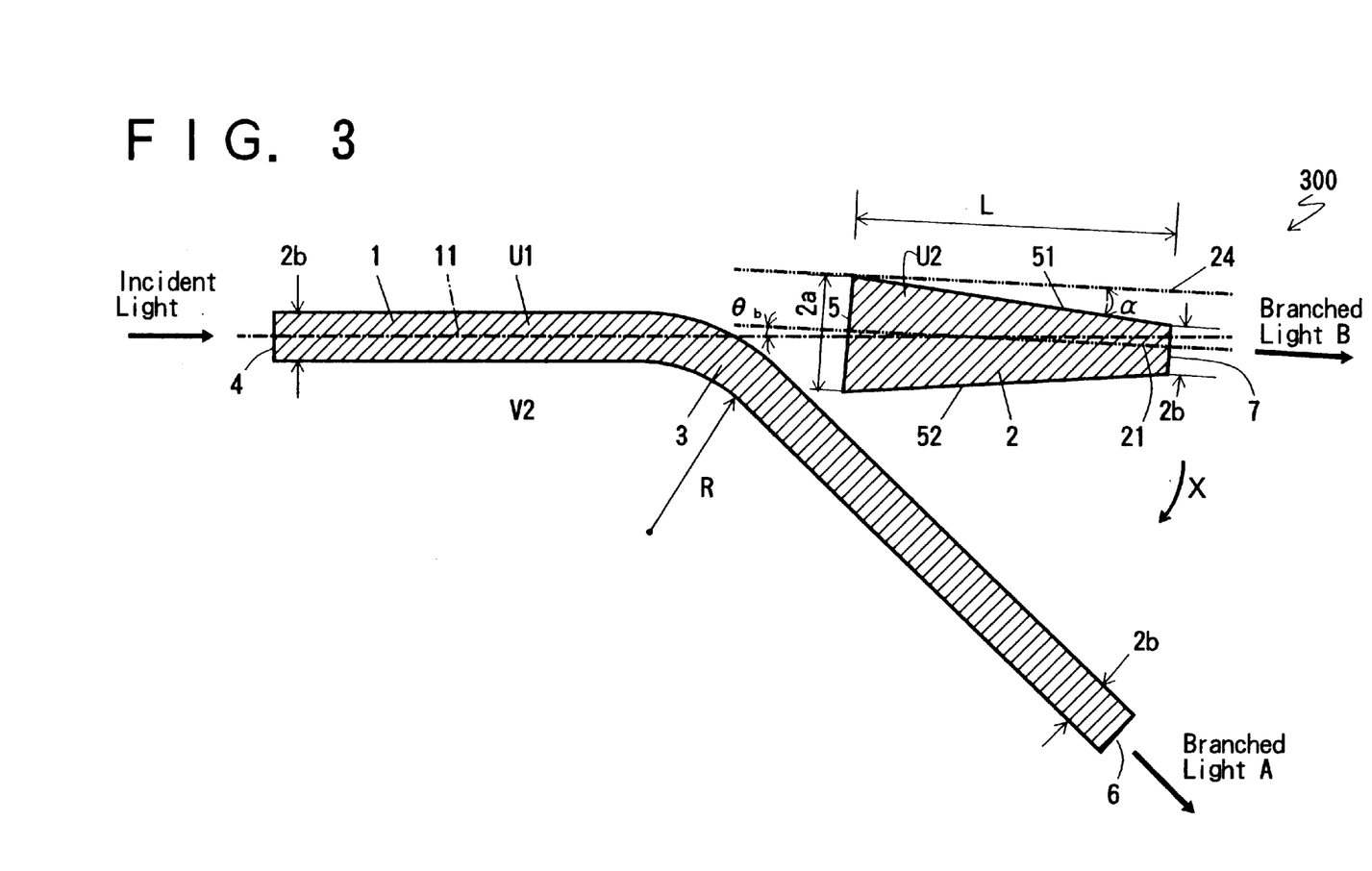
FIG. 3 is a top view of an optical branching device of the second aspect of the present invention.

The second aspect of the present invention shown in FIG. 3 resides in that a central axis 21 of the branching waveguide 2 is tilted from a line 11 extended from a central axis of the straight part of the main waveguide 1 toward a direction X, or the bending direction of the main waveguide 1 of the optical branching device of the first aspect of the present invention.

Figure 1:
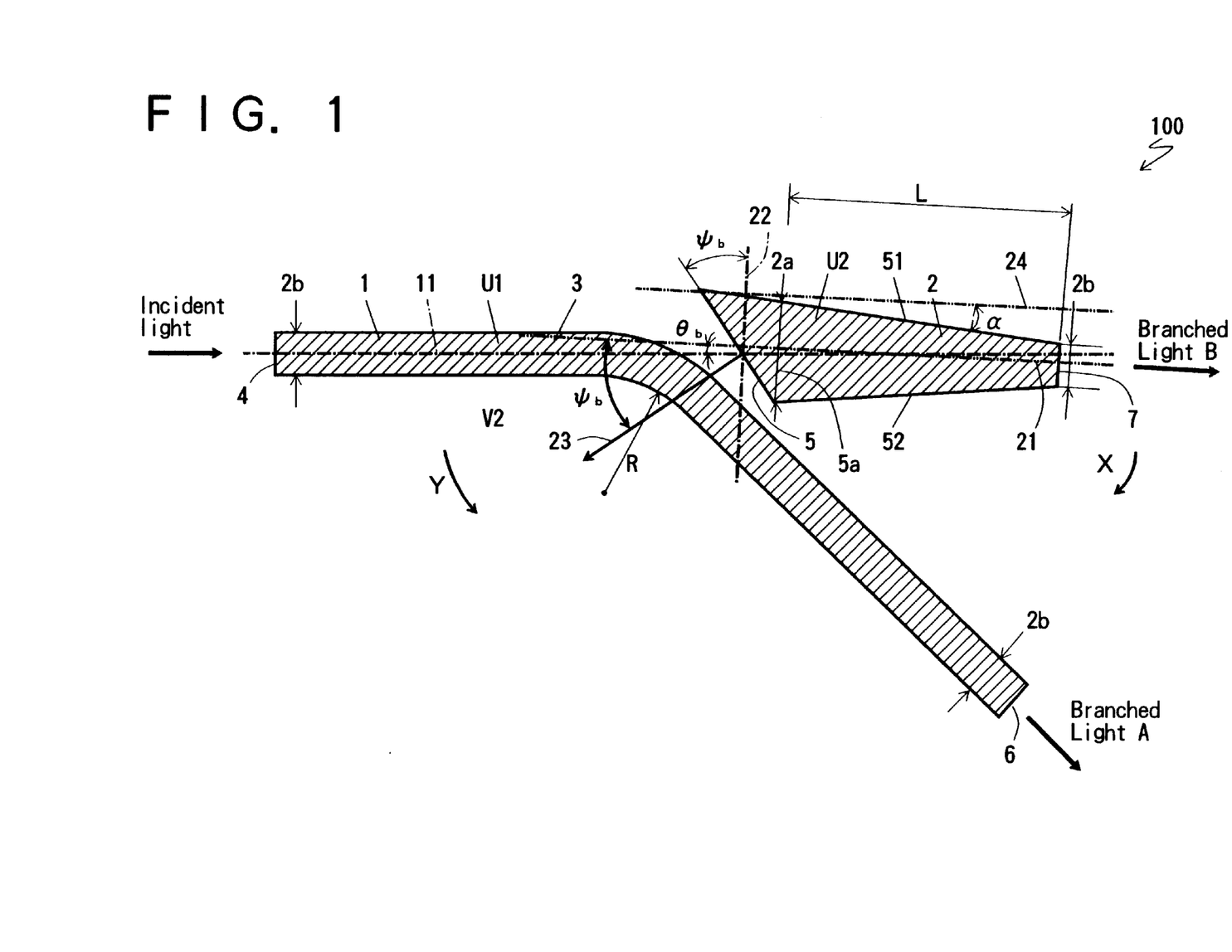
FIG. 1 is a top view of an optical branching device of the third aspect of the present invention.

The third aspect of the present invention shown in FIG. 1 resides in that an input end 5 of the branching waveguide 2 has a normal vector 23 tilted from the central axis 21 of the branching waveguide 2 toward an opposite direction Y of the bending direction of the main waveguide 1 in the optical device of the first or the second aspect of the present invention.

The fourth aspect of the present invention resides in an optical branching device in FIG. 1 which satisfies relation defined by:

$$0 < \alpha \leq \theta_c - \sin^{-1}((n_2/n_1) \cdot \sin \theta_{rmx}) \quad (1),$$

$$0 \leq \theta_b \leq \psi_b - \sin^{-1}((n_1/n_2) \cdot \sin (\psi_b - \theta_c + \gamma)) \quad (2),$$

$$\theta_{rmx} = \pi/2 - \sin^{-1}(n_2/n_1) - \cos^{-1}((n_2/n_1) \cdot ((R+2b)/R)),$$

where $$R \geq 2bn_2/(n_1 - n_2) \quad (3),$$

$$\theta_{rmx} = \sin^{-1}((n_1/n_2) \cdot ((R/(R+2b)) - \sin^{-1}(R/(R+2b))),$$

where $$R < 2bn_2/(n_1 - n_2) \quad (4),$$

$$\theta_c = \pi/2 - \sin^{-1}(n_2/n_1),$$

where $$n_2/n_1 < n_{f2}/n_{f1} \quad (5),$$

and $$\theta_c = \pi/2 - \sin^{-1}(n_{f2}/n_{f1}),$$

where $$n_2/n_1 \leq n_{f2}/n_{f1} \quad (6)$$

when the main waveguide 1 has a sectional area of substantially rectangular shape with a height 2b and a width 2b, a radius R for the bent part 3, and refractive indices $n_1$ and $n_2$ for its core and cladding respectively, the branching waveguide 2 has a height 2b, a taper angle α formed by a side of the branching waveguide 2 and a central axis 21 of the branching waveguide 2, width 2b of an output end, and refractive indices $n_1$ and $n_2$ for its core and cladding respectively, the central axis 21 of the branching waveguide 2 is tilted by $\theta_b$ from an extended line 11 of the central axis of the straight part of the main waveguide 1, the input end 5 of the branching waveguide 2 has a normal vector 23 tilted by $\psi_b$ from the central axis 21 of the branching waveguide 2, and refraction indices for a core and a cladding of another optical device connected to the branching waveguide 2, which is not shown in any figures, are $n_{f1}$ and $n_{f2}$, respectively.

A virtual input end 5a is defined as shown in FIG. 1 which is perpendicular to the central axis 21 of the branching waveguide 2 and passes through the cross point between the input end 5 and the side 52. Length of the central axis 21 between the virtual input end 5a and an output end 7 is defined as L, width of the virtual input end 5a as 2a, and width of the output end 7 as 2b. According to a definition of a taper angle, the taper angle is expressed by:

$$\alpha = \tan^{-1}((a-b)/L) \qquad (7)$$

Accordingly, Eq. 1 can be also expressed by:

$$b < a \leq L \cdot \tan(\theta_c - \sin^{-1}((n_2/n_1) \cdot \sin\theta_{rmx})) + b \qquad (8).$$

The optical branching waveguide 2 of FIG. 2 with a taper structure where an input end of the branching waveguide is enlarged and a width thereof becomes smaller gradually toward the propagation direction of light reduces branching loss of light, because the enlarged input end 5 of the branching waveguide 2 receives radiated light from the bend part 3 of the main waveguide 1 effectively.

A central axis of distribution of the radiated light from the bent part 3 is tilted toward the bending direction of the bent part 3 of the main waveguide 1. Accordingly, the central axis 21 of the branching waveguide 2 is tilted from the extended line It of the central axis of the straight part of the main waveguide 1 toward the direction X, or the bending direction of the main waveguide 1 considering directivity of light, as shown in FIG. 3, so that more radiated light from the bent part 3 of the main waveguide 1 can be received by the input end 5 of the branching waveguide 2. Consequently, branching loss can be further decreased.

Further, the branching waveguide 2 in FIG. 1 is designed and placed to have the normal vector 23 to the input end 5 of the branching waveguide 2 tilted from the central axis 21 of the branching waveguide 2 to the direction Y, or the opposite direction of the bending direction of the main waveguide 1. Accordingly, the branching waveguide 2 can be placed close to the bent part 3 and receive much more radiated light from the bent part 3 of the main waveguide 1 through the input end 5 of the branching waveguide 2. As a result, branching loss can be further decreased.

Further, when the optical branching device 100 in FIG. 1 is designed to satisfy relation expressed by Eqs. 1 to 6 with respect to a taper angle α formed by a side 51 of the branching waveguide 2 and the central axis 21 of the branching waveguide 2, tilting angle $\theta_b$ of the central axis 21, and titling angle $\psi_b$ of the input end 5, radiated light emitted from the bent part 3 of the main waveguide 1 and received by the input end 5 of the branching waveguide 2 is transmitted with a little loss to the output end 7 of the branching waveguide 2. As a result, transmission efficiency of the device 100 is improved.

Other objects, features, and characteristics of the present invention will become apparent upon consideration of the following description in the appended claims with reference to the accompanying drawings, all of which form a part of the specification, and wherein referenced numerals designate corresponding parts in the various figures.

DETAILED DESCRIPTION OF THE PREFERRED EMBODIMENT

The invention will be more fully understood by reference to the following embodiments, but not limited thereto.

FIG. 1 shows an optical branching device 100 comprising a main waveguide 1 and a branching waveguide 2 which are placed on a planer substrate. The main waveguide 1 has a bent part 3 which is bent with a radius R. The branching waveguide 2 is placed near the bent part 3. A core U1 of the optical branching device 100 is shown as a shaded area. A cladding V2 surrounds all surfaces of the core U1, but an outer boundary of the cladding V2 is not shown in any figures.

Both of an input end 4 and an output end 6 of the main waveguide 1 have the same cross-sectional area as that of an output end 7 of the branching waveguide 2. Only an input end 5 of the branching waveguide 2 has a larger area than that of the other three ends. Namely, the branching waveguide 2 has a taper structure whose sectional area gradually becomes smaller toward a propagation direction of light. Further, a central axis 21 of the branching waveguide 2 is titled from an extended line 11 of a central axis of the straight part of the main waveguide 1 toward a direction X to which the main waveguide 1 is bent. A normal vector 23 of the input end 5 of the branching waveguide 2 is tilted from the central axis 21 of the branching waveguide 2 toward a direction Y, or an opposite direction to which the main waveguide 1 is bent.

Incident light launched into the input end 4 is transmitted through the main waveguide 1 and reaches the bent part 3. The incident light is branched there into two. One is transmitted through the main waveguide 1 to the output end 6 of the main waveguide 1 and another is radiated and transmitted into the input end 5 of the branching waveguide 2 to its output end 7.

The optical branching devices 100–300 of the present invention can transmit light effectively with a little branching loss, because the light output from the bent part 3 of the main waveguide 1 is effectively caught by the input end 5 of the branching waveguide 2. This will be explained hereinafter using calculation based on meridional ray approximation in geometrical optics.

Figure 4A:
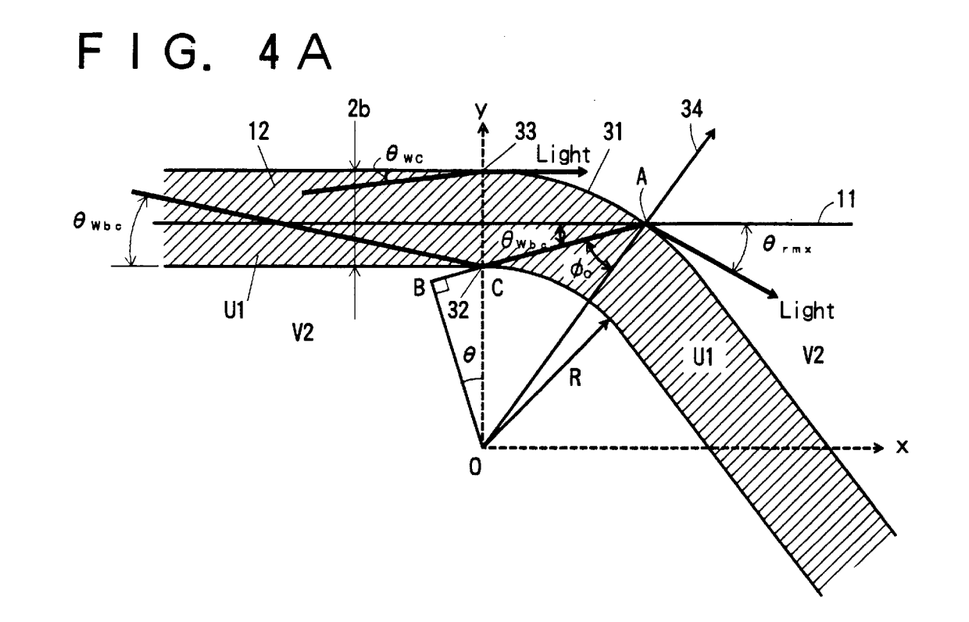
FIGS. 4A and 4B are enlarged view of a bent part of a main waveguide.
Figure 4B:
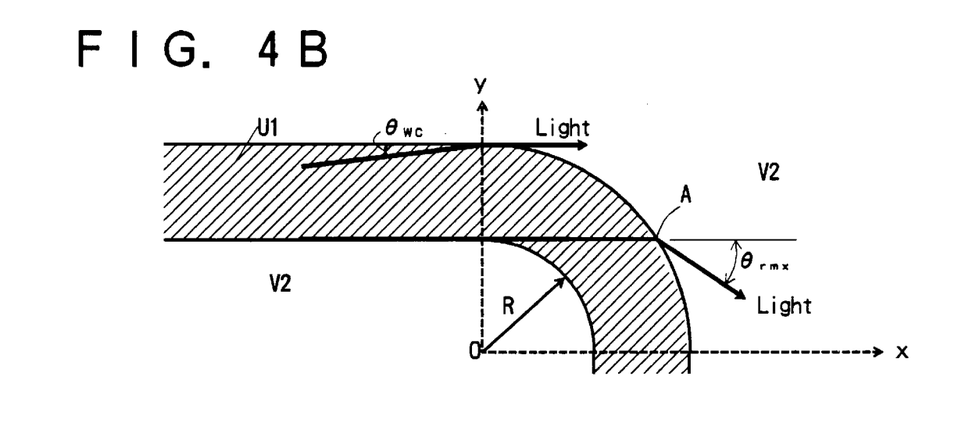

FIGS. 4A and 4B are enlarged views of the bent part 3 of the main waveguide 1 of FIG. 1. As shown in FIG. 4A, light which passes an inner diameter boundary 32, or the point C, which is on a boundary surface between the straight part 12 and the bent part 3 of the main waveguide 1 (where x=0, R≤y≤R+2b), is most likely to be leaked when the light in guided mode reaches an outer diameter boundary 31 between the core U1 and the cladding V2 of the bent part 3. At this time, relation between incident angle φ to the outer diameter boundary 31, or angle OAB shown as $\phi_0$ in FIG. 4A, and angle of propagation θ in the straight part 12 of the main waveguide 1 which is shown as $\theta_{wbc}$ in FIG. 4A is:

$$\sin \phi = (R/(R+2b)) \cdot \cos \theta \qquad (9).$$

In Eq. 9, R is a radius of an arc along which the bent part 3 is formed and 2b is a width of the main waveguide 1.

Eq. 9 is obtained using a right-angled triangle OAB with a right angle OBA and a right-angled triangle OCB with a right angle OBC in FIG. 4A. An angle formed by an axis y and a reflected ray at the point C is ($\pi/2-\theta$). According to a relation of vertical angles, an angle OCB is ($\pi/2-\theta$). As a result, an angle BOC is $\theta$. Since a side OC is equal to the radius R in length and the angle BOC of the right-angled triangle OCB is $\theta$, a side OB is Rcos $\theta$. Further since a side OA of the right-angled triangle OAB is (R+2b) and the angle BAO is $\theta$, the side OB is (R+2b) sin $\phi$. Then, Eq. 9 is obtained, because the side OB obtained by the two ways is equal to each other.

According to Snell's law regarding total reflection, the critical angle $\phi_0$ is obtained by:

$$\sin \phi_0 = n_2/n_1 \qquad (10).$$

In Eq. 10, $n_2$ is refraction index of the cladding V2 and $n_1$ is refraction index of the core U1.

When a propagation angle at which light propagation is cut off in the main waveguide 1 is $\theta_{WC}$, a flux of light which passes the inner diameter boundary 32 between the straight part and the bent part can be propagated within the range of $|\theta| \leq \theta_{WC}$. Among the flux of light, when light reaches the outer diameter boundary 31 between the core $U_1$ and the cladding $V_2$ of the bent part 3 at the critical angle $\phi_0$ at the point A, its propagation angle $\theta_{wbc}$ is expressed by:

$$\theta_{Wbc} = \cos^{-1}((n_2/n_1) \cdot ((R+2b)/R)) \qquad (11).$$

Eq. 11 is obtained by defining $\phi$ as $\phi_0$ and $\theta$ as $\theta_{Wbc}$ in Eq. 9 and substituting Eq. 10 into Eq. 9.

Figure 9:
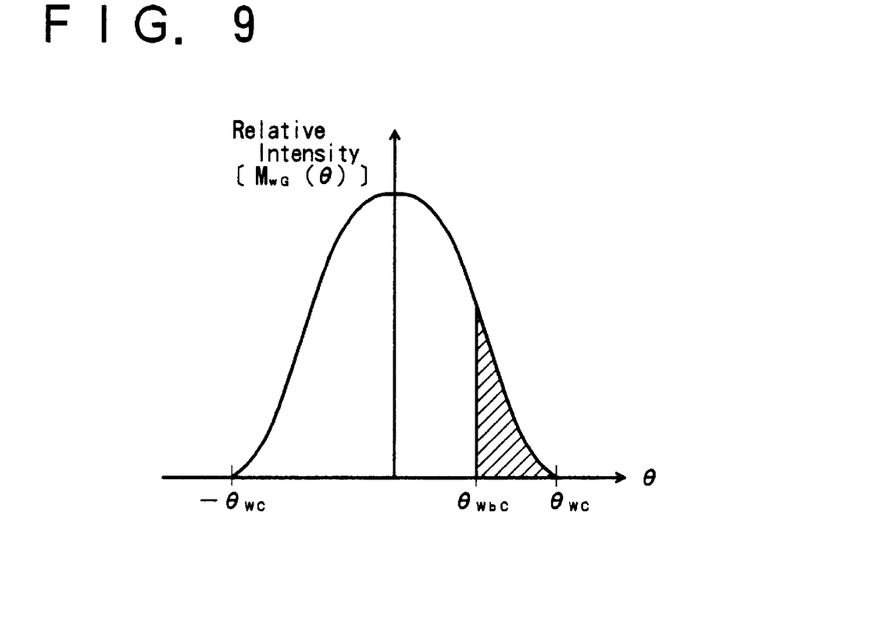
FIG. 9 is a view showing a mode distribution of a propagating light transmitted in the straight part of the main waveguide.

Accordingly, the light having the propagation angle within the range of $\theta_{Wbc} \leq \theta \leq \theta_{WC}$ shown by a shaded area in FIG. 9 is converted from a guided mode to a radiation mode among the flux of light transmitted in the straight part 12 of the main waveguide 1. $\theta_{WC}$ is a critical angle which incurs total reflection in the straight part 12 and is expressed by:

$$\theta_{WC} = \cos^{-1}(n_2/n_1) \qquad (12).$$

Radiated light from the outer diameter boundary 31 has a maximum radiation angle $\theta_{rmx}$ with respect to the extended line 11 when it passes the inner diameter boundary 32 between the straight part 12 and the bent part 3. The direction of the light with maximum radiation angle $\theta_{rmx}$ is toward a tangential line of the outer diameter boundary 31. The maximum radiation angle a $\theta_{rmx}$ is defined by the following equation:

$$\theta_{rmx} = \pi/2 - \sin^{-1}(n_2/n_1) - \cos^{-1}((n_2/n_1) \cdot ((R+2b)/R)) \qquad (13).$$

Eq. 13 is obtained as follows. The angle formed by the central axis 11 of the straight part 12 of the main waveguide 1 and an incident ray at the point A is $\theta_{Wbc}$. The angle formed by the normal vector 34 to the outer diameter boundary 31 at the point A and the central axis 11 is equal to the additional value of $\theta_{Wbc}$ and the critical angle $\theta_0$. An equation, $\theta_{wbc} + \theta_0 \theta_{rmx} = \pi/2$ is satisfied, and $\theta_0$ and $\theta_{Wbc}$ obtained by Eqs. 10 and 11 are substituted into the equation.

When larger intensity of the branched light B is tried to be obtained, i.e., the radius R takes a smaller value given by:

$$R < 2bn_2/(n_1-n_2) \qquad (14),$$

the incident angle of the light with $\theta_{=0}$, which enters into the bent part 3 along a straight line parallel to the central axis of the main waveguide, at the outer diameter boundary 31 becomes smaller than the critical angle $\theta_0$. Accordingly, the light along the straight line is converted into radiation mode and leaks into the cladding $V_2$ as shown in FIG. 4B. In this case, light which passes the inner diameter boundary 32 between the straight part 12 and the bent part 3 with the propagation angle $\theta=0$ takes the maximum radiation angle $\theta_{rmx}$. The $\theta_{rmx}$ is obtained by applying Snell's law to the incident light and transmitted light at the point A as:

$$\theta_{rmx} = \sin^{-1}((n_1/n_2) \cdot (R/(R+2b))) - \sin^{-1}(R/(R+2b)) \qquad (15).$$

On the contrary, light which reaches the outer diameter boundary 33 between the straight part 12 and the bent part 3 with a propagation angle $\theta = -_{WC}$ takes the minimum radiation angle $\theta r = 0$. Accordingly, the radiation angle $\theta_r$ of the radiated light exists within the range $0 \leq \theta_r \leq \theta_{rmx}$ and its spread angle is $\theta_{rmx}$.

When a cross-section of the boundary between the core U1 and the cladding V2 of the main waveguide 1 is formed by ideal straight lines and arcs, the spread angle will be as described above. However, the boundary of an actual device has rugged surfaces. Accordingly, the spreading angle of an actual device takes $\theta_{rmx}$ or more.

Coupling the spread radiated light with a branching waveguide 2 effectively is realized by designing an input end 5 of the branching waveguide 2 as large as possible. However, an output end 7 of the branching waveguide 2 has to correspond to devices connected thereto. Thus, the branching waveguide 2 needs to have a taper structure.

Additionally, the branching waveguide 2 with a taper structure has to be designed with consideration of a maximum taper angle $\alpha_{max}$, because light propagating in the branching waveguide 2 is radiated to be lost when the incident angle of the light becomes smaller than the critical angle of the branching waveguide 2. Therefore, the present invention is aimed at obtaining the maximum angle $\alpha_{max}$ of a taper angle $\alpha$ which prevents loss of light radiated with maximum radiation angle $\theta_{rmx}$ during its transmission in the branching waveguide 2.

Figure 5:
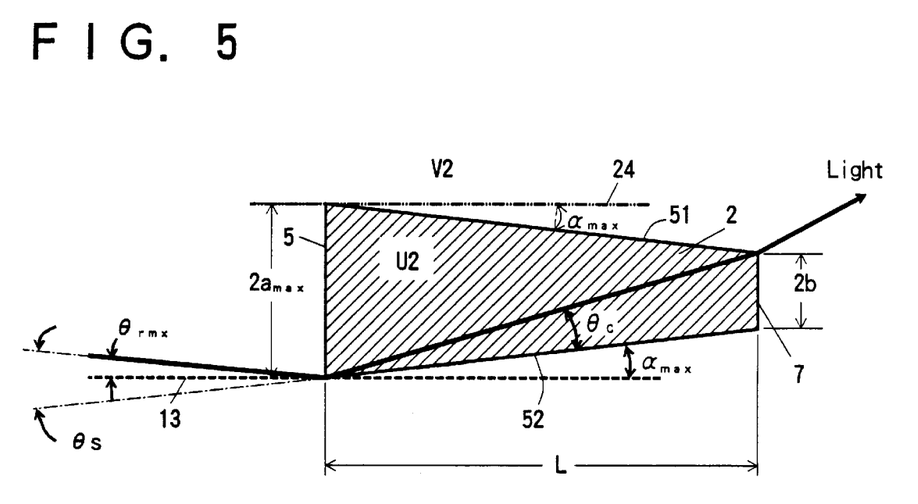
FIG. 5 is an explanatory view of a taper structure of a branching waveguide.

FIG. 5 shows a branching waveguide 2 with a taper structure. The taper angle $\alpha$ of the branching waveguide 2 takes a maximum taper angle $\alpha_{max}$ when the incident light with a maximum propagation angle $\theta_{rmx}$ is totally reflected at an lower corner of the input end 5 by one reflection and the reflected light takes a critical angle to reach an upper corner of the output end 7. The maximum propagation angle $\theta_{rmx}$ is the maximum value of the angle $\theta$ formed by a line 13 parallel to the central axis 11 of the straight part 12 of the main waveguide 1 and the incident light. The maximum taper angle $\alpha_{max}$ is the maximum value of the angle $\alpha$ formed by the line 13 and a lower boundary 52 of the branching waveguide 2. The angle $\alpha_s$ with respect to the lower boundary 52 of the branching waveguide 2 is obtained by adding the maximum propagation angle $\theta_{rmx}$ to the maximum taper angle $\alpha_{max}$. Since $\theta_{rmx}$ is the value in the cladding $V_2$, the converted value of $\theta_{rmx}$ into the core $U_1$ is defined as $\theta_{rmx}'$. The following equation is satisfied:

$$\theta_{rmx}' + \alpha_{max} = \theta_c \qquad (16).$$

According to Snell's law of reflection, the relation between the propagation angle $\theta_{rmx}'$ in the core U1 of the light with the maximum radiation angle and the maximum radiation angle $\theta_{rmx}$ in the cladding V2 is expressed by:

$$n_2 \sin \theta_{rmx} = n_1 \sin \theta_{rmx}' \qquad (17).$$

$\theta_c$ is a smaller value of the maximum propagation angle between the value in the branching waveguide 2 and the value in a waveguide of an optical device connected thereto such as an optical fiber. Here the maximum propagation angle means the maximum propagation angle at which the light in the core can be reflected totally on the boundary between the core and the cladding. Further, $\theta_c$ is the value at which the radiated light can be coupled with a waveguide of other connected devices without NA mismatching loss. According to Snell's law of total reflection, $\theta_c$ is expressed by:

$$\theta_c = \pi/2 - \sin^{-1}(n_2/n_1), \quad (18)$$

where $n_2/n_1 > n_{f2}/n_{f1}$ and $$\theta_c = \pi/2 - \sin^{-1}(n_{f2}/n_{f1}), \quad (19)$$

where $n_2/n_1 \leq n_{f2}/n_{f1}$.

In Eqs. 18 and 19, $n_{f1}$ and $n_{f2}$ are refractive indices of a core and a cladding respectively in a waveguide of optical devices connected to the branching waveguide 2 such as an optical fiber which are not shown in any figures.

According to Eqs. 16 and 17, the maximum taper angle $\alpha_{max}$ is expressed by:

$$\alpha_{max} = \theta_c - \sin^{-1}((n_2/n_1) \cdot \sin \theta_{rmx}) \quad (20).$$

Therefore, the branching waveguide 2 with a taper structure of the first aspect of the present invention and with a taper angle within the range defined by Eq. 1 receives a lot of radiated light at the input end 5 and transmits to the output end 7 with a little transmission loss.

When the length of the branching waveguide 2 is defined as L, the width of the output end 7 as 2b, and the width of the input end 5 with the maximum taper angle $\alpha_{max}$ as $2a_{max}$, definition of the taper angle leads to:

$$\tan \alpha_{max} = (a_{max} - b)/L \quad (21).$$

According to Eqs. 15 to 21, half of the width $a_{max}$ of the input end 5 is expressed by:

$$a_{max} = L \cdot \tan(\theta_c - \sin^{-1}((n_2/n_1 \cdot \sin \theta_{rmx})) + b \quad (22).$$

With Eq. 22, Eq. 1 of the fourth aspect of the present invention can be also expressed by:

$$b < a \leq L \cdot \tan(\theta_c - \sin^{-1}((n_2/n_1) \cdot \sin \theta_{rmx})) + b \quad (23).$$

Figure 6:
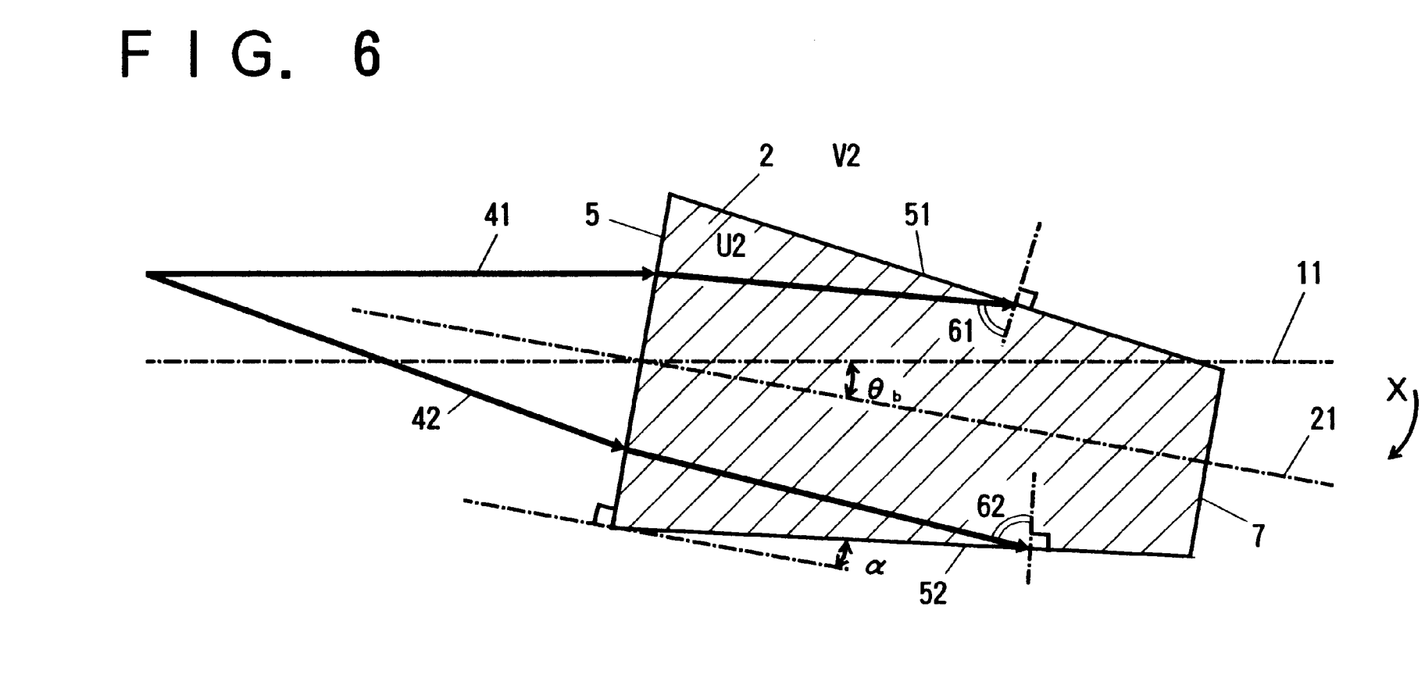
FIG. 6 is an explanatory view of a branching waveguide of the second aspect of the present invention.

Then, the case where the branching waveguide 2 is arranged corresponding to the directivity of the radiated light is explained using FIG. 6. When the central axis 21 of the branching waveguide 2 is tilted toward the direction X to which the main waveguide 1 is bent, incident light 42 with a large radiation angle is difficult to be radiated from the lower boundary 52, because an incident angle 62 with respect to a lower boundary 52 between the core U1 and the cladding V2 becomes large.

On the contrary, the larger a tilted angle $\theta_b$ of the central axis 21 of the branching waveguide 2 becomes, the smaller an incident angle 61 with respect to an upper boundary 51 between the core U1 and the cladding V2 becomes. Accordingly, radiated light 41 with $\theta_r = 0$ begins to be radiated from the upper boundary 51 into the cladding V2. When the receiving angle of the branching waveguide 2 is larger than the propagation angle $\theta_{rmx}'$ in the core U1 of the light with maximum radiation angle and the radiated light 41 with $\theta_r = 0$ reaches to the output end 7 by one total reflection on the boundary 51, the radiated light 41 is not converted into a radiation mode in the branching waveguide 2.

In other words, the branching waveguide 2 arranged or titled corresponding to the directivity of the radiated light easily receives the light 42 with a large radiation angle. Even the radiated light 41 with a small radiation angle is effectively transmitted to the output end 7 when the branching waveguide 2 is tilted within the range in which the radiated light 41 can reach the output end 7 by one total reflection on the boundary 51. As a result, the branching waveguide 2 shown in FIG. 6 can transmit radiated light with a little transmission loss.

Figure 7:
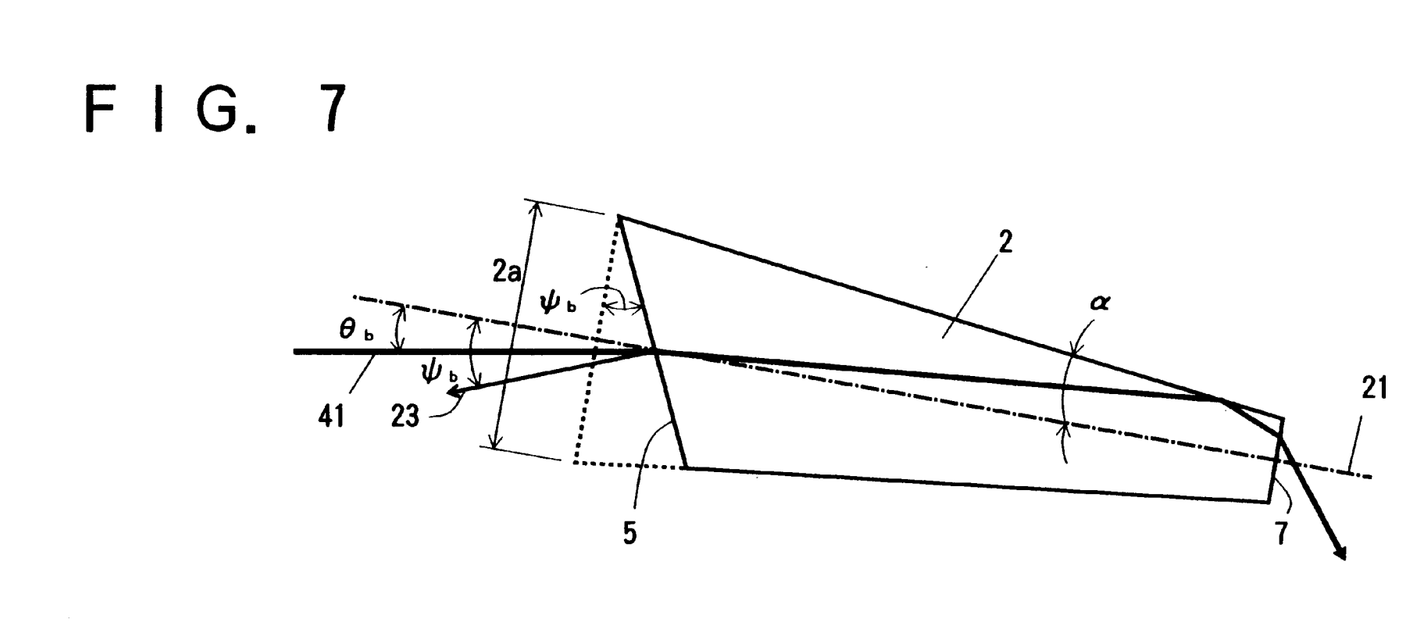
FIG. 7 is an explanatory view of a branching waveguide of the third aspect of the present invention.
Figure 8:
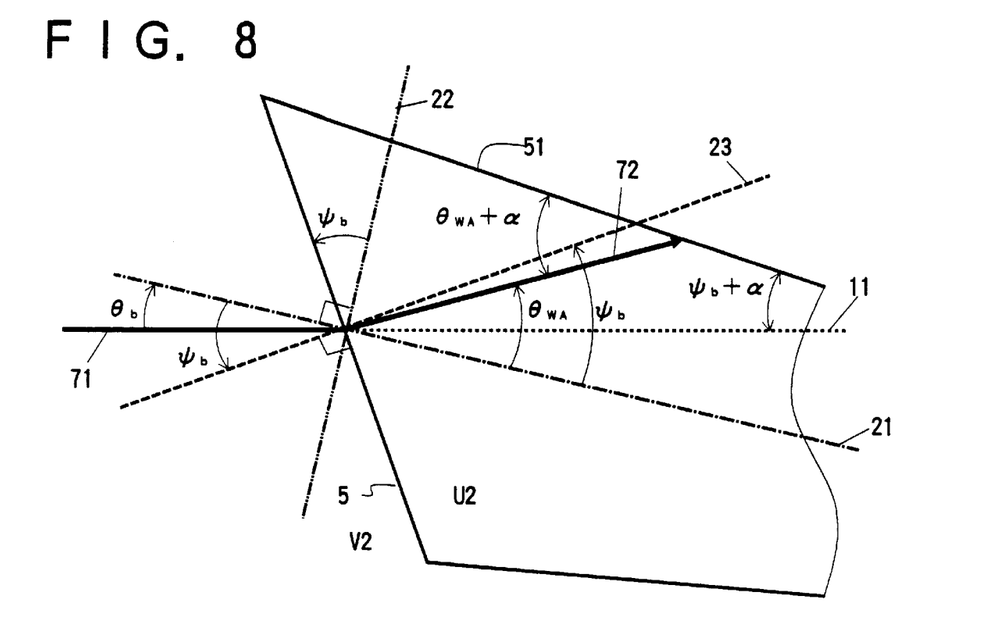
FIG. 8 is an enlarged view of a branching waveguide.

FIGS. 7 and 8 show the branching waveguide 2 of the third aspect of the present invention which is characterized in that a lower corner of an input end 5 was pulled back toward inside by $\psi_b$. Consequently, the branching waveguide 2 can be placed closer to the bent part 3 of the main waveguide 1 and the radiated light can be received by the branching waveguide 2 effectively with a little loss before the light expands.

In FIG. 8, a central axis 21 of the branching waveguide 2 is tilted by $\theta_b$ from the central axis 11 of straight part 12 of the main waveguide 1 toward the bending direction of the main waveguide. A normal vector 23 to the input end 5 of the branching waveguide 2 is tilted by $\psi_b$ from the central axis 21 of the branching waveguide 2 to the opposite direction to the bending one of the main waveguide 1. A propagation angle $\theta_{WA}$ of the light launched into the input end 5 of the branching waveguide 2 shown in FIG. 8 and expressed by:

$$\theta_{WA} = \psi_b - \sin^{-1}((n_2/n_1) \cdot \sin(\psi_b - \theta_b)) \quad (24),$$

when the direction of the arrows for $\psi_b$, $\theta_b$ and $\theta_{WA}$ show positive direction in FIG. 8. Eq. 24 is obtained by defining the incident angle as the angle $(\psi_b - \theta_b)$ formed by light 71 in the cladding V2 and the normal vector 23 and by defining the refraction angle $(\psi_b - \theta_{WA})$ formed by light 72 in the core U1 and the normal vector 23 and using Snell's law. In the range:

$$\psi_b \geq 0, \theta_b \geq 0 \quad (25),$$

the propagation angle $\theta_{WA}$ constantly takes zero or more. As a result, radiated light from the main waveguide 1 with $\theta_r = 0$ is reflected at an upper diameter boundary 51 of the branching waveguide 2. When $\psi_b < 0$, the input end 5 cannot be placed close to the bent part 3 of the main waveguide structurally. When $\theta_b < 0$, the branching waveguide 2 has to be tilted in a way which does not correspond to the directivity of the radiated light from the bent part 3. As a result, transmission efficiency is deteriorated.

Similar to Eq. 16, conditions where the radiated light reaches the critical angle by one total reflection in the branching waveguide 2 with a taper angle $\alpha$ is expressed by:

$$\theta_{WA} + \alpha = \theta_c \quad (26).$$

An inclination $\theta_{bc}$ of the central axis 21 to refract the radiated light from the main waveguide with $\theta_r = 0$ to the critical angle is obtained by substituting Eq. 24 into Eq. 26 and expressed by:

$$\theta_{bc} = \psi_b - \sin^{-1}((n_1/n_2) \cdot \sin(\psi_b \theta_c + \alpha)) \quad (27).$$

Accordingly, designing the branching waveguide 2 with a structure of the third aspect of the present invention within the range defined by Eq. 2 realizes a branching waveguide which receives radiated light effectively and transmit it with a little loss to connected devices.

With a branching waveguide with a structure specified in the first to the third aspects of the present invention, radiated light from the bent part of the main waveguide can be branched effectively. Further, the optimized structure for the branching waveguide is defined by the fourth aspect of the present invention. As a result, an optical branching device which effectively branches optical wave in multimode is obtained.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. An optical branching device comprising:
   a main waveguide having a straight part and a bent part; and
   a branching waveguide formed close to said bent part for receiving radiated light from said bent part;
   wherein said main waveguide and said branching waveguide each have a rectangular cross-section and said branching waveguide has a taper structure such that a width of said branching waveguide is gradually decreased in a propagation direction of light.

2. An optical branching device of claim 1, wherein a central axis of said branching waveguide is tilted from a line extended from a central axis of said straight part toward a bending direction of said main waveguide.

3. An optical branching device of claim 1, wherein an input end of said branching waveguide has a normal vector tilted from said central axis toward an opposite direction of a bending direction of said main waveguide.

4. An optical branching device of claim 2, wherein an input end of said branching waveguide has a normal vector tilted from said central axis toward an opposite direction of a bending direction of said main waveguide.

5. An optical branching device comprising:
   a main waveguide having a straight part and a bent part; and
   a branching waveguide formed close to said bent part for receiving radiated light from said bent part;
   wherein said branching waveguide has a taper structure such that a width of said branching waveguide is gradually decreased in a propagation direction of light, and
   said optical branching device satisfies the following relations:

$0 < \alpha \leq \theta_c - \sin^{-1}((n_2/n_1) \cdot \sin \theta_{rmx})$;

$0 \leq \theta_b \leq \psi_b - \sin^{-1}((n_1/n_2) \cdot \sin (\psi_b - \theta_c + \alpha))$;

$\theta_{rmx} = \pi/2 - \sin^{-1}(n_2/n_1) - \cos^{-1}((n_2/n_1) \cdot ((R+2b)/R))$, where $R \geq 2bn_2/(n_1-n_2)$;

$\theta_{rmx} = \sin^{-1}((n_2/n_2) \cdot ((R/(R+2b))) - \sin^{-1}((R/(R+2b)))$, where $R < 2bn_2/(n_1-n_2)$;

$\theta_c = \pi/2 - \sin^{-1}(n_2/n_1)$, where $n_2/n_1 > n_{f2}/n_{f1}$; and $\theta_c = \pi/2 - \sin^{-1}(n_{f2}/n_{f1})$, where $n_2/n_1 \leq n_{f2}/n_{f1}$, when said main waveguide has a sectional area of substantially rectangular shape with a height $2b$ and a width $2b$, a radius R for said bent part, and refractive indices $n_1$ and $n_2$ for a core and a cladding of said main waveguide, respectively; said branching waveguide has a height $2b$, a taper angle $\alpha$ formed by a side of said branching waveguide and a central axis of said branching waveguide, a width $2b$ of an output and, and refractive indices $n_1$ and $n_2$ for a core and a cladding of said branching waveguide respectively; said central axis of said branching waveguide is tilted by $\theta_b$ from an extended line of said central axis of said straight part; said input end of said branching waveguide has a normal vector tilted by $\psi_b$ from said central axis of said branching waveguide; and refraction indices for a core and a cladding of a waveguide connected to said branched waveguide are $n_{f1}$ and $n_{f2}$, respectively.

* * * * *

UNITED STATES PATENT AND TRADEMARK OFFICE
CERTIFICATE OF CORRECTION

PATENT NO. : 6,081,639

DATED : June 27, 2000

INVENTOR(S): MANABU KAGAMI ET AL

It is certified that an error appears in the above-identified patent and that said Letters Patent is hereby corrected as shown below:

Column 10, line 13, delete "$n_2/n_2$" and insert --$n_1/n_2$--.

Signed and Sealed this

Seventeenth Day of April, 2001

Attest:

NICHOLAS P. GODICI

Attesting Officer     Acting Director of the United States Patent and Trademark Office